United States Patent [19]

Bacha et al.

[11] 4,218,331

[45] Aug. 19, 1980

[54] EXTREME PRESSURE LUBRICATING COMPOSITIONS

[75] Inventors: John D. Bacha, Monroeville, Pa.; Robert W. Hill, Houston, Tex.

[73] Assignee: Gulf Research & Development Company, Pittsburgh, Pa.

[21] Appl. No.: 927,458

[22] Filed: Jul. 24, 1978

[51] Int. Cl.$^2$ .......................... C10M 1/26; C10M 1/38
[52] U.S. Cl. .................................................. 252/48.6
[58] Field of Search ................... 252/48.6, 56 R, 56 D

[56] References Cited

U.S. PATENT DOCUMENTS

| | | | |
|---|---|---|---|
| 2,134,736 | 11/1938 | Reuter | 252/56 R |
| 2,158,096 | 5/1939 | Werntz | 252/56 D |
| 2,443,578 | 6/1948 | Fuller et al. | 252/56 |
| 2,802,024 | 8/1957 | Fasce et al. | 260/488 |
| 3,637,500 | 1/1972 | Forbes et al. | 252/48.6 |
| 3,850,827 | 11/1974 | Zipf | 252/56 S |
| 3,875,069 | 4/1975 | Worschbach et al. | 252/56 S |
| 3,919,187 | 11/1975 | Bourdoncle et al. | 252/48.6 |

*Primary Examiner*—W. J. Shine

[57] ABSTRACT

A sperm oil substitute, having extreme pressure and anti-wear properties consisting of a lubrication composition comprising a major amount of a lubrication oil and a minor amount of an extreme pressure and anti-wear additive, comprising (I) a diester of the condensation product of (A) a dicarboxylic acid or a dicarboxylic acid anhydride, and (B) a linear unsaturated alcohol; and optionally, in combination with, (II) a linear unsaturated alcohol, wherein from about 6 weight percent to about 20 weight percent of said combined diester and linear alcohol comprising the sulfide moiety.

15 Claims, No Drawings

EXTREME PRESSURE LUBRICATING COMPOSITIONS

BACKGROUND OF THE INVENTION

1. Field of the Invention

The present invention resides in lubrication compositions having extreme pressure and anti-wear properties, which are suitable for use as a replacement for sulfurized sperm oil in many lubrication applications.

Recently, over harvesting of sperm whales and their diminishing population has resulted in the inclusion of this species of whale in the United States in the "Endangered Species Conservation Act of 1969". Similarly, a ban went into effect on imports of oil, meat and other products of sperm and seven other species of whale in December 1970 in the United States. The unique liquid wax produced by sperm whales is of importance in various extreme pressure lubricant applications, for example, as tractor hydraulic fluids, automotive gear lubricants, industrial gear lubricants, and automotive transmission fluids. Sperm oil has additionally been sulfonated, oxidized, sulfurized, sulfur-chlorinated, and chlorinated to give products that have use in industry as wetting agents and extreme pressure additives.

Extreme pressure or "E.P." additives, as they are commonly called, are chemicals which are added to lubrication compositions to prevent destructive metal-to-metal contact in the lubrication of moving surfaces. Lubrication oils provide good lubrication between moving surfaces in contact with each other, as long as a film of said oil is maintained between the relative moving surfaces. This particular kind of lubrication is commonly termed "hydrodynamic". However, when pressures or rubbing speeds between moving metal surfaces are such that the film of lubrication oil is wiped or squeezed out, metal-to-metal contact and wear occurs over a significant portion of the lubricated area. Under such conditions, a kind of lubrication called boundary lubrication is needed, and is governed by parameters of the contacting surfaces, for example, surface finish, metal shear strength, and the coefficient of friction between the metals involved. Destructive metal-to-metal contact, due to lack of lubrication under extreme conditions, manifests itself in different forms such as scoring, welding, scuffing, ridging, rippling, and in some cases deformation or complete destruction of the lubrication component.

Extreme pressure and anti-wear lubricating additives prevent destructive metal-to-metal contact, under boundary lubrication conditions, by reacting with relatively moving metal surfaces to form an adherent film of metallic salts which has a lower shear strength than that of the metal surfaces. This film acts in the capacity of a "solid lubricant" and performs the function of lubrication when metal-to-metal contact occurs.

Extreme pressure and anti-wear lubricant additives are characterized by no appreciable formation of "solid lubricant" on the metal surface under hydrodynamic lubrication conditions and a formation of said "solid lubricant" only at the elevated temperatures which develop between the moving metal surfaces under conditions of boundary lubrication.

Research in the area to develop a substitute for sperm oil has taken two approaches. The first involves replacement of the sperm oil derivative with similar chemicals derived from other raw materials that have performance properties equivalent to its sperm oil counterpart. The second approach involves disregarding the chemical nature of sperm oil derivatives and formulating products or compounds that provide equivalent performance properties. However, the unusual combination of composition and properties of sperm oil have made the search for a replacement a difficult one. Thus, a lubrication composition is highly desirable that either matches or surpasses sperm oil as a lubricant.

We have discovered that sulfurized diesters comprising the condensation product of a dicarboxylic acid or a dicarboxylic acid anhydride and a linear unsaturated alcohol, preferably in combination with a minor amount of sulfurized unsaturated alcohol, are suitable for use as a substitute or replacement for sperm oil and its derivatives in extreme pressure and anti-wear lubrication applications.

2. Description of the Prior Art

The use of diesters as a sperm oil substitute is known and appreciated by the prior art. For example, U.S. Pat. No. 3,850,827, entitled "Sperm Oil Substitute From Blend of Carboxylic Acid Esters of Glycols," issued to Zipf, on Nov. 26, 1974, discloses a liquid lubricant comprising a blend of mono and diesters of an organic glycol, for example, ethylene glycol, and a monocarboxylic acid, for example, saturated acids such as capric and unsaturated acids such as oleic, etc. The above diesters can additionally be sulfurized or undergo sulfation to impart desirable characteristics to the compositions.

U.S. Pat. No. 2,802,024, entitled "Diesters of Oxo Glycols," issued to Fasce et al, on Aug. 6, 1957, relates to synthetic lubricating compositions and a method of preparation. Particularly, the reference teaches the preparation of dibasic acid centered complex esters by reacting an oxo glycol with a monobasic acid to form the half ester and reacting the half ester thus formed with a dibasic acid. Similarly, simple diesters are prepared by reacting a glycol with a monobasic acid to form a diester. The diesters thus produced are said to be suitable for use as synthetic lubricants.

Other synthetic lubricants are disclosed in U.S. Pat. No. 3,637,500, entitled "Lubricating Compositions", issued to Forbes et al, on January 25, 1972. Specifically, the reference relates to diesters having a central alkylene group having 1 to 25 carbon atoms, carboxyl groups on either side of the central alkylene group and alkyl groups having from 1 to 10 carbon atoms attached to the carboxyl groups. These diesters are used in combination with disulfides in lubricating compositions, for example, mineral base oils, as synthetic lubricants which are said to increase the load-carrying properties of the base oil.

U.S. Pat. No. 3,919,187, entitled "Sulfur-Containing Compositions of Unsaturated Esters, Their Use as Additives for Lubricating Compositions Containing Them," issued to Bourdoncle et al, on November 11, 1975, relates to lubricating compositions comprising a mineral or synthetic oil in combination with a sulfurized ester consisting of an aliphatic mono- or di- carboxylic acid with at least one aliphatic ethylenically unsaturated monohydric alcohol. The sulfurized diesters are described as suitable substitutes for sulfurized spermaceti oil.

Lubricant compositions are additionally set forth in U.S. Pat. No. 3,875,069, entitled, "Lubricant Compositions Useful in the Shaping of Thermoplastic Materials," issued to Worschech et al, on Apr. 1, 1975, discloses lubricant compositions consisting of mixed esters of aliphatic polyols, dicarboxylic acids and long-chained aliphatic monocarboxylic acids in combination with a second group of esters selected from esters of dicarboxylic acids and long-chained aliphatic alcohols; long-chained aliphatic monocarboxylic acids and long-chained aliphatic alcohols; and complete or partial esters of monocarboxylic acids and aliphatic polyols.

From the foregoing, it can be seen there is an ongoing search for extreme pressure, anti-wear lubrication compositions which are suitable substitutes for sulfurized sperm oil.

SUMMARY OF THE INVENTION

This invention resides in an extreme pressure, anti-wear lubrication composition comprising a major amount of a lubrication oil and a minor amount of an extreme pressure, anti-wear additive comprising (I) a diester derived from (A) a dicarboxylic acid of the formula:

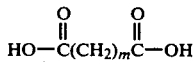

wherein m is an integer of from about 1 to about 10, preferably from about 2 to about 6; or a dicarboxylic acid anhydride of the formula:

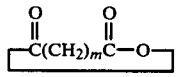

wherein m is defined above; and (B) a linear unsaturated alcohol of the formula:

wherein n is an integer of from about 5 to about 15, preferably from about 5 to about 9; and x is an integer of from about 4 to about 11, preferably from about 7 to about 9; said diester derived from said dicarboxylic acid or dicarboxylic acid anhydride and linear unsaturated alcohol being defined by the formula:

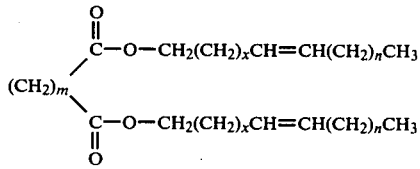

wherein m, n and x are as defined above; and optionally in combination with (II) from about 0 percent by weight to about 15 percent by weight, preferably from about 0 percent to about 10 percent by weight, based on the weight of said diester, of a linear alcohol of the formula:

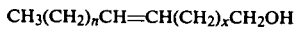

wherein n and x are the integers defined above; and wherein from about 6 weight percent to about 20 weight percent, preferably from about 8 weight percent to about 14 weight percent, of said combined diester and linear alcohol, when used, comprise the sulfide moiety.

DESCRIPTION OF THE INVENTION

The present invention resides in extreme pressure, anti-wear lubrication oil compositions comprising a major amount of an oil of lubrication viscosity and as an extreme pressure and anti-wear additive a minor amount of (I) a sulfurized diester of a dicarboxylic acid or a dicarboxylic acid anhydride and a linear unsaturated alcohol, and in a preferred embodiment, (II) a sulfurized linear alcohol.

The dicarboxylic acids or corresponding dicarboxylic acid anhydrides which are suitable for use herein are those compounds with two carboxyl groups in the saturated aliphatic series. Particularly, the dicarboxylic acids herein are of the formula:

wherein m is an integer defined above. The dicarboxylic acid anhydrides, suitable for use herein, can be prepared, for example, from the corresponding dicarboxylic acids wherein one molecule of water has been removed from each of the two carboxyl groups. Conventional methods and techniques can be used to remove the molecule of water from the carboxylic acids to produce the corresponding acid anhydrides.

Suitable dicarboxylic acids for use herein include: malonic, succinic, glutaric, adipic, pimelic, suberic, azelaic, sebacic, undecanedioic, dodecanedioic dicarboxylic acid and mixtures thereof.

Suitable dicarboxylic acid anhydrides for use herein include the dicarboxylic acid anhydrides corresponding to the specific dicarboxylic acids listed above.

The linear unsaturated alcohols herein preferably are of the formula:

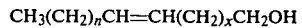

wherein n and x are the integers defined above. Suitable unsaturated linear alcohols are prepared using conventional methods and techniques and include: palmitoleyl, oleyl, petroselinyl, vaccenyl, gadoleyl, docosenyl, cetoleyl, erucyl alcohol and mixtures thereof.

The sulfurized diesters used in the present invention are conveniently prepared from the condensation products of the dicarboxylic acids or dicarboxylic acid anhydrides and linear unsaturated alcohols defined herein. These diesters can be synthesized using conventional methods and techniques.

Although it is not desired to be bound by any theory, it is believed that the diester formation herein proceeds according to the following reactions.

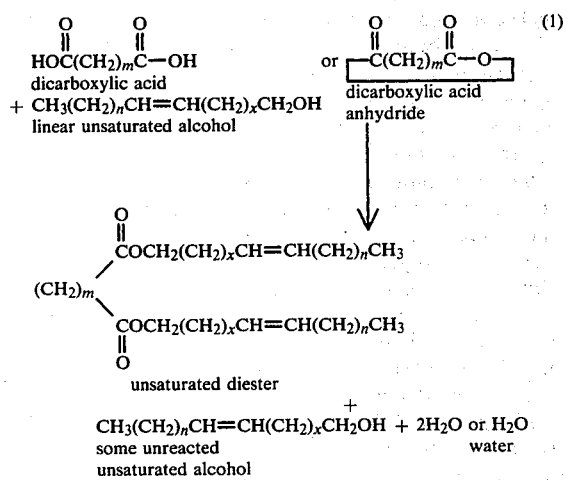

(1)

$$HOC(CH_2)_mC-OH \text{ dicarboxylic acid} + CH_3(CH_2)_nCH=CH(CH_2)_xCH_2OH \text{ linear unsaturated alcohol} \quad \text{or} \quad \overbrace{-C(CH_2)_mC-O-}^{\text{dicarboxylic acid anhydride}}$$

$$\downarrow$$

$$(CH_2)_m \begin{matrix} COCH_2(CH_2)_xCH=CH(CH_2)_nCH_3 \\ COCH_2(CH_2)_xCH=CH(CH_2)_nCH_3 \end{matrix}$$

unsaturated diester
+
$CH_3(CH_2)_nCH=CH(CH_2)_xCH_2OH + 2H_2O$ or $H_2O$
some unreacted            water
unsaturated alcohol The integers m, n and x are as defined above. It is to be noted that the unsaturated diesters have an iodine number of from about 60 to about 100, especially from about 70 to about 90 before sulfurization.

The sulfurization of the diester defined above is believed to proceed as follows:

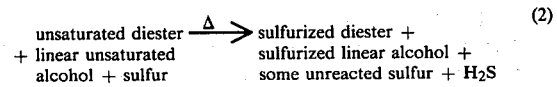

(2)

unsaturated diester $\xrightarrow{\Delta}$ sulfurized diester +
+ linear unsaturated         sulfurized linear alcohol +
alcohol + sulfur            some unreacted sulfur + $H_2S$ The sulfurized diesters and sulfurized alcohols herein have from about 6 weight percent to about 20 weight percent, especially from about 8 weight percent to about 14 weight percent, of the sulfide moiety based on the combined weight of said diesters and alcohols. It is to be noted that the chemistry of the reaction of sulfur with the unsaturated compounds (i.e., diester and linear alcohol) is complex and not completely understood and the general formula of the sulfurized compounds is not known exactly.

It is known that sulfur can be added to lubrication oils to enhance their lubricating properties. The methods and techniques for adding sulfur to lubricants are additionally known. Generally, the more sulfur that can be added to the extreme pressure, anti-wear additives in the lubrication composition the better the lubricating properties thereof. The addition of elemental sulfur to an unsaturated site, such as the double bond in the unsaturated diesters herein, satisfies the bond without releasing any undesirable by-product. It is to be noted that the sulfur atoms can additionally attach to other sulfur atoms, thus increasing the total number of sulfur atoms at any given double bond site. For example, from about 1 to about 3 sulfur atoms can attach at one double bond site by bonding to the sulfur atom attached directly to the site, thus forming additional sulfur bonds thereto. It is to be noted that as many as 10 sulfur atoms can attach to one double bond site by bonding with other sulfur atoms.

In a preferred embodiment, the second component of the extreme pressure, anti-wear additives herein to be used in conjunction with the previously described sulfurized diester is a sulfurized linear unsaturated alcohol of the formula:

$CH_3(CH_2)_nCH=CH(CH_2)_xCH_2OH$ wherein n and x are the integers defined above. Suitable unsaturated linear alcohols include the specific alcohols listed hereinabove.

The above listed alcohols can conveniently be sulfurized using conventional techniques. It is to be noted that the unsaturated linear alcohols have an iodine number of from about 58 to about 128, especially from about 78 to about 105 before sulfurization. The sulfurized alcohols herein have from about 6 weight percent to about 20 weight percent, especially from about 8 weight percent to about 14 weight percent of the sulfur moiety.

Normally, the sulfurized diesters and sulfurized alcohols herein are used in a molar ratio of from about 200:1 to about 2:1, preferably from about 100:1 to about 4:1. The combination of sulfurized diesters and sulfurized alcohols greatly enhance the extreme pressure and anti-wear properties of lubrication oils when added thereto.

The extreme pressure and anti-wear additives described herein can be incorporated in a wide variety of lubrication oils, for example, mineral oils, crude oils, synthetic oils and cutting oils. For example, the additives can be added to lubricating oils derived from paraffinic, naphthenic or mixed base crude petroleum oils, and that have been subjected to solvent and/or sulfuric-acid treatment, aluminum chloride treatment, hydrogenation and/or other refining treatments. Also, the additives described herein can be incorporated in petroleum distillates, such as for example, diesel oil, jet engine oils, furnace oils, kerosene, gas oils, and other light oils. The petroleum oils may be of virgin or cracked petroleum stock, or mixtures thereof, boiling in the range of about 300° F. (148.9° C.) to about 705° F. (398.9° C.) and preferably in the range of about 350° F. (176.7° C.) to about 650° F. (343.3° C.). The petroleum oil may contain cracked components, such as for example, those derived from cycle oils or cycle oil cuts boiling above gasoline, usually in the range of about 450° F. (232.2° C.) to about 750° F. (398.9° C.) and may be derived by catalytic or thermal cracking. Oils of high or low sulfur content such as diesel oils may be used.

Preferred distillate lubrication oils which are improved in accordance with the invention have an initial boiling point within the range of about 350° F. (176.7° C.) to about 475° F. (246.1° C.) and end point in the range of about 500° F. (260° C.) to about 650° F. (343.3° C.), an API gravity of at least about 30 and a flash point (P-M) not lower than about 110° F. (43.3° C.).

The herein described additive comprising sulfurized diesters and sulfurized alcohols can be incorporated in the lubrication oils in any convenient way. Thus, the sulfurized diesters and sulfurized alcohols, if used, can be added directly to the oil by dissolving the desired sulfurized diesters and sulfurized alcohols in the lubricating oil at the desired level of concentration. Normally, the additive comprising sulfurized diesters and sulfurized alcohols are blended with the lubrication oil from about 0.1 to about 10 percent by weight, preferably from about 0.5 to about 5 percent by weight of the oil composition. Alternatively, the additive can be blended with suitable solvents to form concentrates that can be readily dissolved in the appropriate oil at the desired concentration. If a concentrate is employed, it ordinarily will contain at least 10 to about 65 percent by weight of the additive and preferably from 25 to about 65 percent by weight of the sulfurized diesters and sulfurized alcohols. The solvent in such a concentrate may be present in amounts of about 35 to about 74 percent by weight. When the concentrate is added to a lubrication oil, the solvent preferably boils within the range of about 100° F. (37.8° C.) to about 700° F. (371.1° C.). Suitable solvents which can be used for this purpose are naphtha, kerosene, benzene, xylene, toluene, hexane, light mineral oil and mixtures thereof. The particular solvent selected should, of course, be selected so as not to adversely affect the other desired properties of the ultimate oil composition. Thus, the solvent for use in incorporating the additive in a fuel oil should preferably burn without leaving a residue and should be noncorrosive with respect to metal, specifically ferrous metals.

Synthetic lubrication oils which are improved in accordance with the invention include those derived from solid carbonaceous products are conveniently prepared by blending finely ground carbonaceous materials with a solvent to form a slurry. The slurry is then introduced into a reaction vessel containing a conventional hydrogenation catalyst and is reacted under normal hydrogenating pressures and temperatures. After hydrogenation, solids that are present can conveniently be removed from the product stream. The product is next stripped of solvent. The balance of the product stream may be distilled to obtain products of various boiling ranges, for example, hydrocarbons boiling in the gasoline range and hydrocarbons boiling in the lubricating oil range. Some of the products are useful as fuels and oils, the remainder can be further treated by a conventional petroleum process including cracking, hydrocracking, and the like. Synthetic lubrication oils produced from solid carbonaceous products such as coal are primarily aromatic and generally have a boiling range of about 300° F. (149° C.) to about 1400° F. (760° C.), a density of about 0.1 to about 1.1 and a carbon to hydrogen molecular ratio in the range of about 1.3:1 to about 0.66:1. A typical example is a lubrication oil obtained from a subbituminous coal, such as Wyoming-Montana coal; comprising a middle oil having a boiling range of from about 375° F. (190.5° C.) to about 675° F. (375° C.). A description of how to prepare synthetic lubrication oils from carbonaceous material is set forth in greater detail in U.S. Pat. No. 3,957,619 issued to Chun et al on May 18, 1976, entitled, "Process for the Conversion of Carbonaceous Materials," the disclosure of which is incorporated herein by reference.

Alternatively, the synthetic oil improved herein can be a nonhydrocarbon oil of lubricating viscosity. Suitable examples include synthetic oils obtained by polymerization of lower molecular weight alkylene oxides, such as propylene oxide and/or ethylene oxide employing alcohol or acid initiators, such as lauryl alcohol or acetic acid. Other typical synthetic oils include esters, for example, di(2-ethylhexyl)-silicate, tricresylphosphate and silicate esters, such as tetra-(2-ethylhexyl)-orthosilicate and hexa(2-ethylbutoxy)-disiloxane.

If desired, the extreme pressure, anti-wear additives described herein can be employed in conjunction with other additives commonly used in petroleum products. Thus, there can be added to the oil compositions of this invention rust and corrosion inhibitors, anti-emulsifying agents, antioxidants, dyes, haze inhibitors, anti-static agents and other detergent dispersant inhibitors, viscosity index improvement agents and pour point reducing agents. Soaps or other thickening agents may be added to the lubricating oil compositions to form compositions having the consistency of a grease. When other additives are employed, it may be desirable, although not necessary, to prepare additive concentrates comprising concentrated solutions of the herein sulfurized diesters and sulfurized linear alcohols together with said other additives whereby the several additives are added simultaneously. Dissolution of the additive or additive concentrate into the oil composition may be facilitated by mixing accompanied with mild heating, but this is not absolutely essential.

Synthetic lubrication oils as defined herein are those oils derived from a product of chemical synthesis or man-made oils. Typical examples of such compositions include the polyglycol fluids (i.e., polyalkylene glycol); silicones which consist of a silicone-oxygen polymer chain to which are attached hydrocarbon branches composed of either alkyl or phenyl groups; phosphates; polyphenyl esters; synthetic hydrocarbons and various esters of organic acids and alcohols.

The polyalkylene glycol lubricating oils suitable for use herein preferably are derived from the reaction product of the appropriate alkylene oxides. The alkylene moiety of the above compositions have a carbon chain of from about 1 to about 10 carbon atoms, preferably from about 2 to about 7 carbon atoms and a molecular weight within the range of from about 200 to about 2000, especially from about 200 to about 1000, most preferably from about 200 to about 800. Representative examples of suitable polyalkylene glycols include, polyethylene glycol, polypropylene glycol, polyisopropylene glycol, polybutylene glycol and the like.

The name silicone as used herein denotes a polymer of the formula $(R_nSiO(4-n)/2)_m$ wherein n is an integer of from about 9 to about 3 and m is 2 or larger. The compound contains a repeating silicone-oxygen backbone and has organic groups R, wherein R is methyl, phenyl, vinyl and the like. The silicones herein have an average molecular weight within the range of from about 400 to about 9000.

The polyphenyl ethers suitable for use herein have from 3 to 7 benzene rings and from 1 to 6 oxygen atoms, with the stated oxygen atoms joining the stated benzene rings in chains as ether linkages. One or more of the stated benzene rings in these polyphenyl ethers may be hydrocarbonyl-substituted. The hydrocarbonyl substituents, for thermal stability, must be free of $CH_2$ and aliphatic CH so that preferred aliphatic substituents are lower saturated hydrocarbon radicals (1 to 6 carbon atoms) like methyl and tert-butyl, and preferred aromatic substituents are aryl radicals like phenyl and tolyl. In the latter case, the benzene ring supplied in the hydrocarbonyl substituent contributes to the total number of benzene rings in the molecule. Polyphenyl ethers consisting exclusively of chains of from 3 to 7 benzene rings with at least one oxygen atom joining the stated benzene rings in the chains as an ether linkage have particularly desirable thermal stability.

Exemplary of the alkyl polyphenyl ethers suitable for use are 3-ring polyphenyl ethers like 1-(p-methylphenoxy)-4-phenoxybenzene and 2,4-diphenoxy-1-methyl-benzene, 4 ring polyethers like bis[p-(p-methylphenoxy)phenyl]ether and bis[(p-tert-butylphenoxy)phenyl]ether, and the like.

Polyphenyl ethers consisting exclusively of benzene rings and ether oxygen atoms linking said rings are exemplified by the triphenoxy benzenes and aryl-substituted polyphenyl ethers such as biphenyl phenoxyphenyl ether, biphenylyloxyphenyl phenoxyphenyl ether, biphenylyl ether, dibiphenylyloxybenzene, bis(-phenylyloxyphenyl)ether, and the like.

A preferred class of polyphenyl ethers comprises those consisting of benzene rings joined in a chain by oxygen atoms as ether linkages between each ring. Examples of the polyphenyl ethers contemplated in the class are the bis(phenoxy-phenyl)ethers (4 benzene rings joined in a chain by 3 oxygen atoms), illustrative of which is bis(m-phenoxyphenyl)ether. The bis(phenoxyphenoxy)benzenes are particularly valuable in the present invention. Illustrative of these are m-bis(m-phenoxy-phenoxy)benzene, m-bis(p-phenoxy-phenoxy)benzene, o-bis(o-phenoxy-phenoxy)benzene, and so forth. Further, the polyphenyl ethers contemplated herein include the bis(phenoxy-phenoxy-phenyl)ethers such as bis[m-(m-phenoxy-phenoxy)phenyl]ether, bis[p-(p-phenoxy-phenoxy phenyl]ether, m-(m-phenoxy-phenoxy)phenyl m-(o-phenoxy-phenoxy)phenyl ether and the bis(phenoxy-phenoxy-phenoxy)benzenes such as m-bis[m-phenoxy-phenoxy-phenoxy]benzene, p-bis[p-(m-phenoxy-phenoxy)phenoxy]benzene and m-bis[m-(p-phenoxy-phenoxy)phenoxy]benzene.

Synthetic lubrication oils derived from hydrocarbons are generally of two types, namely, dialkylated benzene and polymerized alpha-olefins. Dialkylated benzene herein is formed from the condensation product of the appropriate alkyl compound and has a carbon chain from about 5 to about 50 carbon atoms, preferably from about 8 to about 20 carbon atoms; and a molecular weight of from about 200 to about 1500, preferably from about 300 to about 700. Representative compounds include di-n-decylbenzene, n-decyl-n-tetradecylbenzene, and t-nonyl-t-dodecylbenzene.

Alpha-olefins suitable for use in preparing lubrication oils herein are characterized by the formula $RCH=CH_2$, wherein R is a radical selected from the group of hydrogen and alkyl radicals having from about 4 to about 18 carbon atoms, preferably from about 6 to about 10 carbon atoms, and having a molecular weight of from about 80 to about 300, preferably from about 100 to about 200. Typical compounds include 1-octene, 1-decene and 1-dodecene.

Phosphates suitable for use herein as synthetic lubrication oils are the phosphate esters having the formula $O=P(OR)_3$, wherein R is aryl or alkyl having from about 4 to about 20 carbon atoms, preferably from 6 to about 10 carbon atoms, and have a molecular weight within the range of from about 200 to about 1,000, preferably from about 300 to about 550. Representative compounds include trioctyl phosphate, tricresyl phosphate and dicresyl methyl phosphate.

Esters of organic acids which are suitable for use herein as synthetic lubrication oils preferably are selected from organic acids having carbon chains of from $C_4$ to $C_{10}$ carbon units. Organic acids which can be reacted with the alcohols herein include caproic, decanoic, sebacic, etc. Likewise, alcohols herein can be derived from either natural or synthetic origin for example, pentaerythritol, trimethylolpropane, amyl or 2-ethylhexanol can be used to form the desired ester. The esters are formed using conventional methods. For example, the esters may be prepared by reaction of the desired alcohol with the desired acid anhydride or acid halide under reaction conditions.

Cutting oils suitable for use herein are defined as a liquid applied to a cutting tool or apparatus to assist in a cutting or machining process by washing away chips or serving as a lubricant or coolant, for example in cutting, threading, and similar metal-working operations. Cutting oils are preferably obtained from conventionally refined lubricating oils containing film-strength additives, or sulfurized naphthene-base oils which can additionally contain emulsifying agents. Representative cutting oils and agents include: water, water solutions or emulsions of detergents and oils, mineral oils, fatty oils, chlorinated mineral oils, sulfurized mineral oils and mixtures thereof.

DESCRIPTION OF PREFERRED EMBODIMENTS

Example I

Synthesis of Dioleyl Glutarate. Dioleyl glutarate was synthesized by refluxing 421.2 grams (1.57 moles) oleyl alcohol, 85.6 grams (0.75 mole) glutaric anhydride, 204 grams (300 ml) heptane and 0.96 grams (0.01 mole) methane sulfonic acid under a nitrogen atmosphere for 5 hours in a 3-liter, 3-necked flask equipped with an air driven stirrer, thermometer, reflux condenser and heating mantle. Water produced in the reaction was removed in a Dean-Stark trap. The product solution was allowed to cool to 25° C. overnight with agitation and under a nitrogen atmosphere. Next, the product solution was diluted with 300 ml of hexane, washed with 2% aqueous sodium hydroxide and dried over molecular sieves. Most of the hydrocarbon solvent was removed by rotary evaporation using a water aspirator vacuum source. High vacuum stripping at a pressure of from 1.5 mm.Hg. to 2.0 mm.Hg. and a temperature of from 240° C. to 260° C. for 4 hours removed the last traces of solvent. Analysis indicates that the dioleyl glutarate produced contained 3.8% oleyl alcohol.

The dioleyl glutarate containing 3.8% oleyl alcohol produced was analyzed with the following results:

Table 1

| Assay of Dioleyl Glutarate[a] | |
|---|---|
| Molecular Weight | 633.10 |
| Neutralization NO.[b] | 0.14 |
| Saponification NO.[c] | |
| Calculated[d] | 170.00 |
| Found[e] | 177.00 |
| Iodine NO.[f] | |
| Calculated | 80.20 |
| Found | 80.00 |
| Unsaturation NO.[g] | 0.32 |

[a] combined product from 3 runs to synthesize dioleyl glutarate
[b] mg of KOH to neutralize 1 gm of product
[c] mg of KOH required to hydrolyze 1 gm of product
[d] calculated assuming 4.1% alcohol in product
[e] within 10 units allowable
[f] gm of $I_2$ that combine with 100 gms of unsaturated product
[g] unsaturated sites per 100 gms of product

EXAMPLE II

Sulfurization of Dioleyl Glutarate and Oleyl Alcohol

The dioleyl glutarate produced in Example I was sulfurized by placing 1 kg. (1.579 moles) of the diester, including oleyl alcohol (4.1% by weight of the diester) into a 3-liter, 3-necked flask equipped with an air driven stirrer, thermometer, reflux condenser and heating mantle. The dioleyl glutarate, including oleyl alcohol, was heated to about 132° C. over a period of 0.3 hour. Sulfur (101 gms., 3.156 moles) was added in 5 equal portions over a 1-hour period while keeping the temperature of the stirred mixture at 138° C. to 149° C. The temperature was raised to 167° C. over a 0.2 hour period, and then held at 167° C. to 180° C. for a period of 1 hour. Next, nitrogen was blown through the product for 5 hours to expel hydrogen sulfide. The reaction mixture was cooled to 25° C. and allowed to stand unstirred overnight. Thereafter, the mixture was reheated to 168° C. for 1 hour, after which nitrogen was again blown through the reaction mixture for 2.5 hours (temperature 168° C. to 175° C.), to essentially remove the remaining hydrogen sulfide, as indicated by lead acetate indicator paper test of the off gas. After cooling to about 50° C., the product was transferred to a storage container. The weight of the recovered product was 1096 grams or 99.5% of the weight of materials charged to the reactor. The properties of the sulfurized dioleyl glutarate and sulfurized oleyl alcohol are indicated in Table II below.

Table II

| | |
|---|---|
| Sulfur, Wt % | 8.48 |
| Specific Gravity (15.6° C.) | 0.9774 |
| Viscosity, SUS | |
| 100° F. | 4,308.0 |
| 210° F. | 426.0 |
| Viscosity, Cs | |
| 100° F. | 930.0 |
| 210° F. | 91.3 |
| Pour Point °C. | 3.9 |

EXAMPLE III

The procedures of Example I and Example II were followed with the following exception: the sulfurized dioleyl glutarate and oleyl alcohol were prepared with a higher sulfur content ($\approx 12\%$). The properties of the resultant extreme pressure lubrication additive are listed in Table III below.

Table III

| | |
|---|---|
| Sulfur, Wt % | 11.91 |
| Specific Gravity (15.6° C.) | 0.9979 |
| Viscosity, SUS | |
| 100° F. | 7,220 |
| 210° F. | 600 |
| Viscosity, Cs | |
| 100° F. | 1,570 |
| 210° F. | 128.8 |
| Pour Point, °C. | +15 |

EXAMPLE IV

A sulfurized dioleyl glutarate was prepared by following the procedures of Example I and Example II with the following exceptions: all of the oleyl alcohol was removed from the reaction product and the dioleyl glutarate was prepared with a higher sulfur content. The properties of the diester are set forth in Table IV below:

Table IV

| | |
|---|---|
| Sulfur, Wt % | 12.44 |
| Specific Gravity | 1.004 |
| Viscosity, SUS | |
| 100° F. | 11,478 |
| 210° F. | 915 |
| Viscosity, Cs | |
| 100° F. | 2,478 |
| 210° F. | 196.2 |
| Pour Point, °C. | +15 |

EXAMPLE V

Synthesis of Dioleyl Adipate

Dioleyl adipate was synthesized by refluxing 733 grams (2.73 moles) oleyl alcohol, 190 grams (1.30 moles) adipic acid, 340 grams (500 ml.) heptane and 1.9 grams (0.02 mole) methane sulfonic acid under a nitrogen atmosphere for 5 hours, in a 3-liter, 3-necked flask equipped with an air driven stirrer, thermometer, reflux condenser and heating mantle. Approximately 47 ml. of water produced in the reaction was removed in a Dean-Stark trap. The reaction mixture was cooled to 25° C., diluted with 500 ml. of hexane and the resulting solution was washed 3 times with successive 200 ml. portions of 2% aqueous sodium hydroxide and water, followed by a water wash until the solution tested neutral using PH paper. The washed solution was clarified by vacuum filtration through a 1.4 inch bed of celite and dried over molecular sieves. Rotary evaporation removed most of the solvent from the reaction mixture. The remaining solvent was removed from the reaction mixture by high vacuum stripping at a pressure of 0.3 mm. Hg and a temperature of about 250° C. to about 265° C. The dioleyl adipate produced was examined and found to contain 2.1% oleyl alcohol.

The dioleyl adipate composition produced was analyzed with the following results:

Table V

| Assay of Dioleyl Adipate[a] | |
|---|---|
| Molecular Weight | 647.10 |
| Neutralization NO.[b] | 0.13 |
| Saponification NO.[c] | |
| Calculated[d] | 170.0 |
| Found[e] | 175.0 |
| Iodine NO.[f] | |
| Calculated | 78.40 |
| Found | 78.0 |
| Unsaturated NO.[g] | 0.3073 |

[a]combined product from 3 runs to synthesize dioleyl adipate.
[b]mg. of KOH to neutralize 1 gm. of product.
[c]mg. of KOH required to hydrolyze 1 gm. of product.
[d]calculated assuming 4.1% alcohol in product.
[e]within 10 units allowable.
[f]gm. of I$_2$ that combine with 100 gms. of unsaturated product.
[g]unsaturated sites per 100 gms. of product.

EXAMPLE VI

Sulfurization of Dioleyl Adipate and Oleyl Alcohol

The dioleyl adipate and oleyl alcohol produced in Example V was sulfurized by placing 1 Kg. (1.545 moles) of the product, including 2.8% oleyl alcohol, into a 3-liter, 3-necked flask, equipped with an air driven stirrer, thermometer, reflux condenser and heating mantle. The dioleyl adipate, including oleyl alcohol, was heated to about 132° C. for 1 hour. Sulfur (98.5 gms., 30.73 moles) was added in 5 equal portions over a 1 hour period; the temperature was maintained at about 130° C. to about 138° C. during the addition of sulfur. Next, the temperature was raised to 165° C. for 0.2 hour, and held at 175°±10° C. for 1 hour. Nitrogen was blown through the product for 4 hours to expel hydrogen sulfide. The product was cooled to 25° C. and allowed to stand unstirred overnight. Thereafter, the mixture was reheated to 170° C. for 2.5 hours, during which nitrogen was again blown through the reaction mixture to essentially remove the remaining hydrogen sulfide, as indicated by lead acetate indicator paper test of the off gas. After cooling to about 50° C., the product was transferred to a storage container. The weight of recovered product was 1093 grams or 99.5% of the weight of charged materials. The properties of the sulfurized dioleyl adipate and sulfurized oleyl alcohol are summarized in Table VI below.

Table VI

| | |
|---|---|
| Sulfur, Wt % | 8.68 |
| Specific Gravity (15.6° C.) | 0.9754 |
| Viscosity, SUS | |
| 100° F. | 4,3874 |
| 210° F. | 326 |
| Viscosity, Cs | |
| 100° F. | 860 |
| 210° F. | 71.0 |
| Pour Point °C. | +12.8 |

EXAMPLE VII

The procedures of Example V and Example VI were followed with the following exception: the sulfurized dioleyl adipate and oleyl alcohol were prepared with a higher sulfur content ($\approx 12\%$). The properties of the resultant extreme pressure, anti-wear lubrication additive are summarized in Table VII below.

Table VII

| | |
|---|---|
| Sulfur, Wt % | 11.81 |
| Specific Gravity (15.6° C.) | 0.9982 |
| Viscosity, SUS | |
| 100° F. | 6,448 |
| 210° F. | 551 |
| Viscosity, Cs | |
| 100° F. | 1,392 |
| 210° F. | 118.2 |
| Pour Point, °C. | +45 |

EXAMPLE VIII

A sulfurized dioleyl adipate was prepared by following the procedures of Example V and Example VI with the following exceptions: all of the oleyl alcohol was removed from the reaction product, and the dioleyl adipate was prepared with a higher sulfur content. The properties of the diester are set forth in Table VIII below.

Table VIII

| | |
|---|---|
| Sulfur, Wt % | 12.44 |
| Specific Gravity (15.6° C.) | 1.004 |
| Viscosity, SUS | |
| 100° F. | 11,478 |
| 210° F. | 915 |
| Viscosity, Cs | |
| 100° F. | 24.78 |
| 210° F. | 196.2 |
| Pour Point, °C. | +15 |

EXAMPLE IX to XII

The experimental sulfurized diesters and sulfurized alcohols produced in Examples I through VIII were mixed with cutting oils and evaluated for performance. The results are indicated in Table IX below.

Table IX

| Component: % by Vol. | Ex. IX | Ex. X | Ex. XI | Ex. XII |
|---|---|---|---|---|
| 100 Texas oil | 85.75 | 85.75 | 85.75 | 85.75 |
| 1900 Texas oil | 7.00 | 7.00 | 7.00 | 7.00 |
| Sulfurized Dioleyl Adipate + Sulfurized oleyl alcohol (9.4 wt %) | 7.25 | — | — | — |
| Sulfurized Dioleyl Glutarate | — | 7.25 | — | — |
| Sulfurized Dioleyl Adipate | — | — | 7.25 | — |
| Sulfurized Dioleyl Glutarate + Sulfurized oleyl alcohol (9.6 wt %) | — | — | — | 7.25 |
| Inspections: | | | | |
| Viscosity, SUS, 100° F. | 177.0 | 189.5 | 186.4 | 184.7 |
| T.A.N., ASTM:D974 | 0.29 | 0.20 | 0.26 | 0.18 |
| Insolubles: % | | | | |
| n-pentane | 0.05 | 0.07 | 0.03 | 0.16 |
| benzene | 0.02 | 0.03 | 0.01 | 0.04 |
| residue | 0.03 | 0.4 | 0.02 | 0.02 |
| Copper Corrosion | | | | |
| ASTM:D130, 3 hr. | | | | |
| 122° F. | 1 | 1 | 1 | 1 |
| 212° F. | 2 | 2 | 2 | 2 |
| 250° F. | 2 | 2 | 2 | 2 |
| 300° F. | 4 | 4 | 4 | 4 |
| S.O.D. Corrosion Test[a] | | | | |
| 6 hrs. 325° F. | | | | |
| Lead Loss: Mg/Cm$^2$ | −1.60 | −14.6 | −9.10 | −12.9 |
| Copper Loss: Mg/Cm$^2$ | −19.0 | −13.3 | −17.4 | −15.7 |
| Insolubles, Oxide Oil | | | | |
| n-pentane | 0.08 | 0.86 | 0.02 | 0.06 |
| benzene | — | — | — | — |
| residue | — | — | — | — |
| Viscosity, 100° F., % | +11.3 | +5.0 | +7.8 | +6.3 |
| T.A.N., ASTM:D974 | +0.34 | +0.37 | +0.34 | +0.40 |
| Falex Wear Test[b] | | | | |
| 15 min, 500 lb, Rm Temp. | | | | |
| Seizure Load LBS | 1,950 | 1,100 | 1,500 | 1,300 |
| Wear: Teeth | 0 | 2 | 0 | 0 |

[a]S.O.D. Corrosion Test - FTMS 791-5321
[b]Falex Wear Test - ASTM:D 2670

The performance data in Table IX above demonstrate the utility of the sulfurized esters and sulfurized alcohols. While in the corrosion tests, insolubles developed in the oxidized oil, and changes in viscosity or total acid number are good and of similar magnitude for all cases, the wear test demonstrates superior performance of these materials containing sulfurized esters, as described above, and/or in combination with sulfurized alcohols, i.e., compare seizure load in Example IX versus Example X and Example XI versus Example X.

EXAMPLES XIII to XVII

Experiments were conducted to evaluate the sulfurized diesters and sulfurized alcohol produced in Examples I through VIII, as compared with a Control, i.e., a typical E.P. lubrication formulation (Example XIII). The results are summarized in Table X below.

Table X

| | Ex. XIII | Ex. XIV | Ex. XV | Ex. XVI | Ex. XVII |
|---|---|---|---|---|---|
| Component: % by Vol. | | | | | |
| 150 MC Bright Stock | 96.25 | 96.25 | 96.25 | 96.25 | 96.25 |
| Maysperm 2011[A] | 3.75 | — | — | — | — |
| Antioxidant[B] | 0.25 | 0.25 | 0.25 | 0.25 | 0.25 |
| Sulfurized Dioleyl Adipate | — | 3.75 | — | — | — |
| Sulfurized Dioleyl Glutarate | — | — | 3.75 | — | — |
| Sulfurized Dioleyl Adipate + Sulfurized oleyl alcohol (9.4 wt %) | — | — | — | 3.75 | — |
| Sulfurized Dioleyl Glutarate + Sulfurized oleyl alcohol (9.6 wt %) | — | — | — | — | 3.75 |
| Anti-foam agent[C] | 0.03 | 0.03 | 0.03 | 0.03 | 0.03 |
| Inspections: | | | | | |
| Viscosity, SUS, 210° F. | 156.3 | 164.0 | 167.2 | 162.8 | 162.7 |
| Timken OK Load: LBS[D] | 50 | 45 | 40 | 45 | 40 |
| 4-Ball E.P.[E] | | | | | |
| Weld Pt.: Kg | 200 | 200 | 200 | 200 | 200 |
| L.W.I.[F] | 42.6 | 42.8 | 42.8 | 36.6 | 43.0 |
| 4-Ball Wear,[G] 1800 RPM, 130° F., 1 hr | | | | | |
| Steel/Steel Scar Diameter | | | | | |
| 20 kg | 0.42 | 0.33 | 0.34 | 0.39 | 0.39 |
| 40 kg | 0.73 | 0.61 | 0.58 | 0.61 | 0.61 |
| Steel/Bronze Scar Diameter | | | | | |
| 20 kg | 1.49 | 1.60 | 1.20 | 1.40 | 1.30 |
| 40 kg | 1.63 | 1.50 | 1.50 | 1.80 | 1.60 |
| Dynamic oxidation[H] 250° F., Cu Roller 12.5 LBS $O_2$, 72 hrs. | | | | | |
| Sludge: mg | 254 | 304 | 318 | 204 | 204 |
| Viscosity Cs, 210° F.: % | −3.5 | −2.6 | −4.2 | −3.4 | −2.7 |
| Pressure Drop: PSI | 28 | 35 | 40 | 10 | 15 |

[A] a sulfurized synthetic sperm oil manufactured commercially by Mayco Oil & Chemical Company located in Bristol, PA.
[B] 4,4′ dimethylamino diphenyl methane.
[C] a silicone; 3% dimethyl polysiloxane in mineral oil.
[D] ASTM:D 2782
[E] ASTM:D 2783
[F] L.W.I. = Load wear index
[G] ASTM:D 2266
[H] ASTM:D 942

The test data in Table X above indicate that in essentially all cases, performance is very similar or superior to that of the base case in Example XIII. It is to be noted that in the Steel/Steel 4-ball wear test, results are similar or somewhat better than that of the base case (Example XIII). Results of the dynamic oxidation test attest to the superior stability of these materials which contain sulfurized diesters and/or in combination with sulfurized alcohols substantially as described herein. Additionally, it is to be noted that less sludge is formed and less oxygen is absorbed by the system.

It is to be noted that the above Examples are representative of the best mode of how to practice the invention herein described and are not intended to limit the scope of the appended claims.

We claim:

1. An extreme pressure, anti-wear lubrication composition consisting essentially of a major amount of a lubrication oil and a minor amount of an extreme pressure, anti-wear additive consisting essentially of a mixture of a sulfurized diester and sulfurized alcohol, said additive having been obtained by reacting a dicarboxylic acid of the formula:

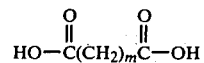

wherein m is an integer of from about 1 to about 10, or a dicarboxylic acid anhydride of the formula:

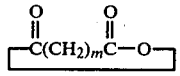

wherein m is defined above with a linear unsaturated alcohol of the formula:

wherein n is an integer of from about 5 to about 15, and x is an integer of from about 4 to about 11, resulting in a diester defined by the formula:

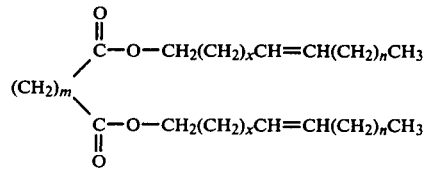

wherein m, n and x are as defined above, combining said diester with a linear alcohol of the formula:

wherein n and x are the integers defined above and sulfur and heating said reactants to obtain said mixture of a desulfurized diester and sulfurized alcohol, wherein from about 6 weight percent to about 20 weight percent of said combined sulfurized diester and sulfurized linear alcohol comprise the sulfide moiety and the sulfurized diester and the sulfurized alcohol are present in a molar ratio of about 200:1 to about 2:1.

2. The extreme pressure, anti-wear lubrication composition of claim 1 wherein m is an integer of from about 2 to about 6.

3. The extreme pressure, anti-wear lubrication composition of claim 1 wherein n is an integer of from about 5 to about 9.

4. The extreme pressure, anti-wear lubrication composition of claim 1 wherein x is an integer of from about 7 to about 9.

5. The extreme pressure, anti-wear lubrication composition of claim 1 wherein from about 8 weight percent to about 14 weight percent of said combined diester and linear alcohol comprises the sulfide moiety.

6. The extreme pressure, anti-wear lubrication composition of claim 1 wherein the dicarboxylic acid is a member selected from the group consisting of malonic, succinic, glutaric, adipic, pimelic, suberic, azelaic, sebacic, undecanedioic, dodecanedioic and mixtures thereof.

7. The extreme pressure, anti-wear lubrication composition of claims 1 or 6 wherein the dicarboxylic acid is a member selected from the group consisting of glutaric, adipic and mixtures thereof.

8. The extreme pressure, anti-wear lubrication composition of claim 1 wherein the linear unsaturated alcohol is a member selected from the group consisting of palmitoleyl, oleyl, petroselinyl, vaccenyl, gadoleyl, docosenyl, cetoleyl, erucyl and mixtures thereof.

9. The extreme pressure, anti-wear lubrication composition of claims 1 or 8 wherein the linear unsaturated alcohol is oleyl alcohol.

10. The extreme pressure, anti-wear lubrication composition of claim 1 wherein the linear alcohol in II is a member selected from the group consisting of palmitoleyl, oleyl, petroselinyl, vaccenyl, gadoleyl, docosenyl, cetoleyl, erucyl and mixtures thereof.

11. The extreme pressure, anti-wear lubrication composition of claims 1 or 10 wherein the linear alcohol in II is oleyl alcohol.

12. The extreme pressure, anti-wear lubrication composition of claim 1 wherein said sulfurized diesters and sulfurized alcohols are in a molar ratio of from about 100:1 to about 4:1.

13. The extreme pressure, anti-wear lubrication composition of claim 1 wherein the lubrication oil is a member selected from the group consisting of mineral oils, crude oils, distillate fuel oils, synthetic oils, cutting oils and mixtures thereof.

14. The extreme pressure, anti-wear lubrication composition of claim 1 wherein the sulfurized diesters and sulfurized alcohols are blended with the lubrication oil from about 0.1 to about 10 weight percent of said lubrication oil.

15. The extreme pressure, anti-wear lubrication composition of claim 1 wherein the sulfurized diesters and sulfurized alcohols are blended with the lubrication oil from about 0.5 to about 5 weight percent of said lubrication oil.

* * * * *

UNITED STATES PATENT OFFICE
CERTIFICATE OF CORRECTION

Patent No. 4,218,331     Dated August 19, 1980

Inventor(s) John D. Bacha and Robert W. Hill

It is certified that error appears in the above-identified patent and that said Letters Patent are hereby corrected as shown below:

COL. 14, Table IX, Example X of Inspections: residue "0.4" should read --0.04--.

Signed and Sealed this

Eighteenth Day of November 1980

[SEAL]

Attest:

SIDNEY A. DIAMOND

Attesting Officer     Commissioner of Patents and Trademarks